United States Patent
Panou

(10) Patent No.: US 10,289,785 B1
(45) Date of Patent: May 14, 2019

(54) PLATFORM ARCHITECTURE CREATION FOR A SYSTEM-ON-CHIP

(71) Applicant: Xilinx, Inc., San Jose, CA (US)

(72) Inventor: Sozon Panou, Santa Clara, CA (US)

(73) Assignee: XILINX, INC., San Jose, CA (US)

(*) Notice: Subject to any disclaimer, the term of this patent is extended or adjusted under 35 U.S.C. 154(b) by 301 days.

(21) Appl. No.: 15/266,963

(22) Filed: Sep. 15, 2016

(51) Int. Cl.
*G06F 17/50* (2006.01)
*G06F 9/445* (2018.01)
*G06F 9/455* (2018.01)

(52) U.S. Cl.
CPC ...... *G06F 17/5054* (2013.01); *G06F 9/44505* (2013.01); *G06F 9/45558* (2013.01); *G06F 2009/45583* (2013.01)

(58) Field of Classification Search
CPC ............. G06F 17/5054; G06F 9/44505; G06F 9/45558; G06F 2009/45583
See application file for complete search history.

(56) References Cited

U.S. PATENT DOCUMENTS

| | | | | |
|---|---|---|---|---|
| 8,190,714 B2* | 5/2012 | Davidson | ............... | G06F 9/4416 707/999.001 |
| 9,147,024 B1* | 9/2015 | Kathail | ................ | G06F 17/5045 |
| 9,165,143 B1* | 10/2015 | Sanders | ................ | G06F 21/575 |
| 9,336,010 B2* | 5/2016 | Kochar | ................ | G06F 9/4401 |
| 9,652,570 B1* | 5/2017 | Kathail | ................ | G06F 17/505 |
| 2018/0210811 A1* | 7/2018 | Wang | ...................... | G06F 11/36 |

* cited by examiner

*Primary Examiner* — Naum Levin
(74) *Attorney, Agent, or Firm* — Kevin T. Cuenot

(57) ABSTRACT

Creating a platform architecture can include receiving, using a computer, user input specifying a plurality of attributes of the platform architecture, wherein the platform architecture is adapted for implementation in a system-on-chip, and determining, based on the attributes and using the computer, a processing domain of the platform architecture, wherein the processing domain includes a processor, a software operating context, a device, and a memory. A hardware description of the platform architecture is generated using the computer. The hardware description specifies the processing domain, wherein the operating context is adapted for execution by the processor, and the device and the memory are addressable by the processor.

20 Claims, 6 Drawing Sheets

800

```
┌─ Device Instance ─────────────────────┐
│  ● Use Existing  [PS CAN #0        ⇕] │
│  ◉ Create New    [                 ⇕] │
│                                       │
├─ CAN ─────────────────────────────────┤
│  Transfer Rate  [1 Mbps            ⇕] │
│  ┌─ Mode of Operation ──────────────┐ │
│  │  ◉ Sleep Mode                    │ │
│  │  ◉ Snoop Mode                    │ │
│  │  ● Loop Back Mode                │ │
│  └──────────────────────────────────┘ │
└───────────────────────────────────────┘
```

PLATFORM ARCHITECTURE CREATION FOR A SYSTEM-ON-CHIP

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This disclosure relates to integrated circuits (ICs) and, more particularly, to creating a platform architecture for implementation within a system-on-chip type of IC.

BACKGROUND

A system-on-chip (SOC) is a type of integrated circuit that includes a processor configured to execute program code and one or more other circuits. The processor and the other circuits typically are implemented using a same die. The other circuits may be implemented as hardwired circuitry, programmable circuitry, and/or a combination thereof. The circuits may operate cooperatively with one another and/or with the processor.

Modern SOCs have thousands of different configuration options. As noted, one class of SOC includes both a processor and programmable circuitry. The programmable circuitry may be implemented as field programmable gate array circuitry. The available configuration options of this particular class of SOC are even greater in number than other classes of SOCs.

SUMMARY

An embodiment includes a method of creating a platform architecture. The method can include receiving, using a computer, user input specifying a plurality of attributes of the platform architecture, wherein the platform architecture is adapted for implementation in a system-on-chip (SOC), and determining, based on the attributes and using the computer, a processing domain of the platform architecture, wherein the processing domain includes a processor, a software operating context, a device, and a memory. The method can include generating, using the computer, a hardware description of the platform architecture specifying the processing domain, wherein the operating context is adapted for execution by the processor, and the device and the memory are addressable by the processor.

Another embodiment includes a system for creating a platform architecture. The system includes a computer configured to initiate executable operations. The executable operations can include receiving user input specifying a plurality of attributes of the platform architecture, wherein the platform architecture is adapted for implementation in an SOC, and determining, based on the attributes, a processing domain of the platform architecture, wherein the processing domain includes a processor, a software operating context, a device, and a memory. The executable operations further can include generating a hardware description of the platform architecture specifying the processing domain, wherein the operating context is adapted for execution by the processor, and the device and the memory are addressable by the processor.

Another embodiment includes a computer program product. The computer program product includes a computer readable storage medium having program code stored thereon for creating a platform architecture. The program code is executable by a computer to perform operations including receiving user input specifying a plurality of attributes of the platform architecture, wherein the platform architecture is adapted for implementation in an SOC, and determining, based on the attributes, a processing domain of the platform architecture, wherein the processing domain includes a processor, a software operating context, a device, and a memory. The operations can also include generating a hardware description of the platform architecture specifying the processing domain, wherein the operating context is adapted for execution by the processor, and the device and the memory are addressable by the processor.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIGS. 6-8 are example graphical user interfaces for creating a platform architecture for an SOC.

DETAILED DESCRIPTION OF THE DRAWINGS

Figure 1:
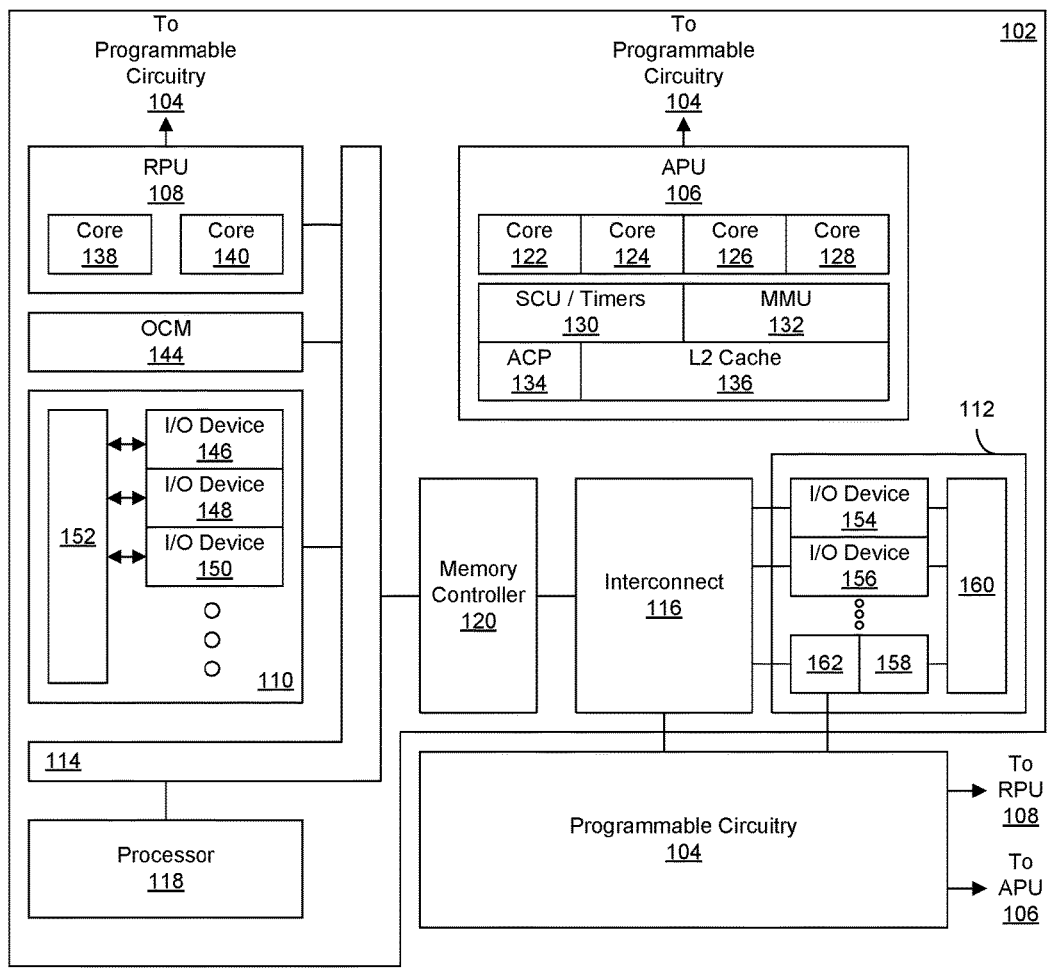
FIG. 1 is an example of a system-on-chip (SOC).

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to creating a platform architecture for implementation within a system-on-chip (SOC) type of IC. When designing application level hardware and software for an SOC, a platform architecture is needed. The platform architecture is implemented within the SOC to host and execute the application hardware and software (hereafter "the application"). In general, the platform architecture defines the specific circuit structures, connectivity among circuit structures, and configuration options of the environment implemented within the SOC.

In one aspect, a platform architecture includes one or more different processing domains. Each of the processing domains of the platform architecture includes a particular processor, a software operating context for the processor, memory for the processor, and any devices addressable by the processor. As used herein, the term "addressable" in reference to a processor means that the processor is configured, or adapted, to interact with the particular component that is said to be addressable. For example, a processor is capable of reading from or writing to a particular component or otherwise communicating with a particular component that is addressable by the processor. The processor uses the address information to communication and/or interact with the particular component.

In defining the processing domains of the platform architecture, one or more of the devices of the processing domain may be implemented as hardwired circuit blocks or as programmable circuit blocks. For example, a device may be implemented within a processing domain as a hardwired circuit block or a circuit block that is implemented using programmable circuitry of the SOC. One or more other elements of the processing domain may be virtualized. For example, the processor, memory, devices, etc. of a processing domain may be virtualized.

With the platform architecture defined, a designer, e.g., a user, develops the application that is hosted and executed. In the usual case, a hardware designer creates the hardware portion of the platform architecture. Once defined, the hardware portion of the platform architecture has traditionally remained static and is unchanged throughout the remainder of the development process. In accordance with the example embodiments described within this disclosure, the platform architecture may be created using a software development environment that is usable by both hardware and software designers. Moreover, once created, the platform architecture may be continually changed and/or updated. In one aspect, any changes to the hardware of the platform architecture may be synchronized to the software operating context. Similarly, any changes to the software operating context may be synchronized to the hardware of the platform architecture.

In one aspect, one or more example embodiments described herein are implemented as a method or process performed by a data processing system. In another aspect, one or more example embodiments described herein are implemented as a data processing system having a processor configured to perform the operations described within this disclosure. In still another aspect, one or more example embodiments are implemented as a computer-readable storage medium storing program code that, when executed, causes a processor and/or computer to perform and/or initiate the operations described within this disclosure.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is an example of an SOC 100. SOC 100 further is an example of a programmable SOC in which a platform architecture is implemented. As defined within this disclosure, the term "programmable SOC" means an SOC that includes programmable circuitry. For example, a programmable SOC may include one or more hardened processors that are configured to execute program code and programmable circuitry such as field programmable gate array (FGPA) circuitry.

In the example of FIG. 1, SOC 100 includes a hardened processor system (PS) 102 that includes a plurality of different processors. In one aspect, the different processors of PS 102 are physically distinct instances, but have same architectures (use same instruction sets). In another aspect, the different processors of PS 102 are physically distinct instances and have two or more different architectures among the processors.

SOC 100 further includes programmable circuitry 104. In general, the functionality of programmable circuitry 104 is not established until configuration data is loaded into configuration memory cells (not shown) of SOC 100. A set of configuration bits may be used to program programmable circuitry 104. The configuration bit(s) typically are referred to as a "configuration bitstream" or "bitstream." In general, programmable circuitry is not operational or functional without first loading a configuration bitstream into SOC 100. The configuration bitstream effectively implements a particular circuit design within programmable circuitry 104. The circuit design specifies, for example, functional aspects of the programmable circuit blocks and physical connectivity among the various programmable circuit blocks implemented therein.

Circuitry that is "hardwired" or "hardened," i.e., not programmable, is manufactured as part of SOC 100. Unlike programmable circuitry 104, hardened circuitry or hardened circuit blocks are not implemented after the manufacture of SOC 100 through the loading of a configuration bitstream. Hardened circuitry is generally considered to have dedicated circuit blocks and interconnects, for example, that are functional without first loading a configuration bitstream into SOC 100.

In the case of SOC 100, a configuration bitstream may specify the circuitry that is to be implemented within programmable circuitry 104, configuration options for elements within PS 102, and the program code that is to be executed by elements of PS 102. The configuration bitstream, for example, may include user specified applications in addition to the platform architecture that hosts and executes the user application(s).

Continuing with FIG. 1, PS 102 includes an application processing unit (APU) 106, a real time processing unit (RPU) 108, input/output (I/O) subsystems 110 and 112, interconnects 114 and 116, a processor 118, and a memory controller 120. APU 106 is a multi-core structure that includes cores 122, 124, 126, and 128. For purposes of discussion within this disclosure, a core is considered a "processor" that is configured to execute program code. APU 106 further includes a snoop control unit (SCU)/Timers 130, memory management unit (MMU) 132, an accelerator coherency port (ACP) 134, and a level 2 (L2) cache 136. As pictured, APU 106 further has a direct connection to programmable circuitry 104.

RPU 108 includes cores 138 and 140. RPU 108 also has a direct connection to programmable circuitry 104 and is coupled to interconnect 114. In one embodiment, RPU 108 is capable of executing real-time applications. Examples of real-time applications include, but are not limited to, automotive, mass storage, mobile baseband, medical, and/or industrial applications.

PS 102 includes an on-chip memory (OCM) 144. OCM 144 is coupled to interconnect 114. I/O subsystem 110 includes a plurality of I/O devices 146, 148, and 150 each coupled to a multiplexer I/O (MIO) 152. MIO 152 is configurable to provide PS 102 and/or programmable circuitry 104 with access to nodes external to SOC 100 and to the various I/O devices of SOC 100. MIO 152 may be configured on a per pin basis and may facilitate concurrent access to the nodes and/or I/O devices by PS 102 and programmable circuitry 104. I/O devices 146, 148, and 150 are also coupled to interconnect 114. Processor 118 is coupled to interconnect 114. In one aspect, processor 118 is hardened. Memory controller 120 is coupled to interconnect 114 and to interconnect 116. I/O subsystem 112 includes a plurality of I/O devices 154, 156, and 158, each coupled to interconnect 116 and to a streaming interface 160. I/O device 158 is coupled to interconnect 116 via a direct memory access (DMA) circuit 162. DMA circuit 162 is also coupled to programmable circuitry 104, thereby directly coupling I/O device 158 to programmable circuitry 104.

As noted, in one aspect, the different processors (e.g., including cores) may have different architectures. In one example embodiment, processor 118 is implemented as a hardened version of the MicroBlaze™ processor from Xilinx, Inc. of San Jose, Calif. Cores 122-128 are implemented as Cortex®-A5x NEON processors from Arm Ltd. of Cambridge, UK. Cores 138-140 are implemented as Cortex®-R5 processors also available from Arm Ltd. The example processor architectures described herein are provided for purposes of illustration. One skilled in the art will appreciate that other architectures may be used for implementing processors in SOC 100 such as an x86 processor architecture and so forth.

Figure 2:
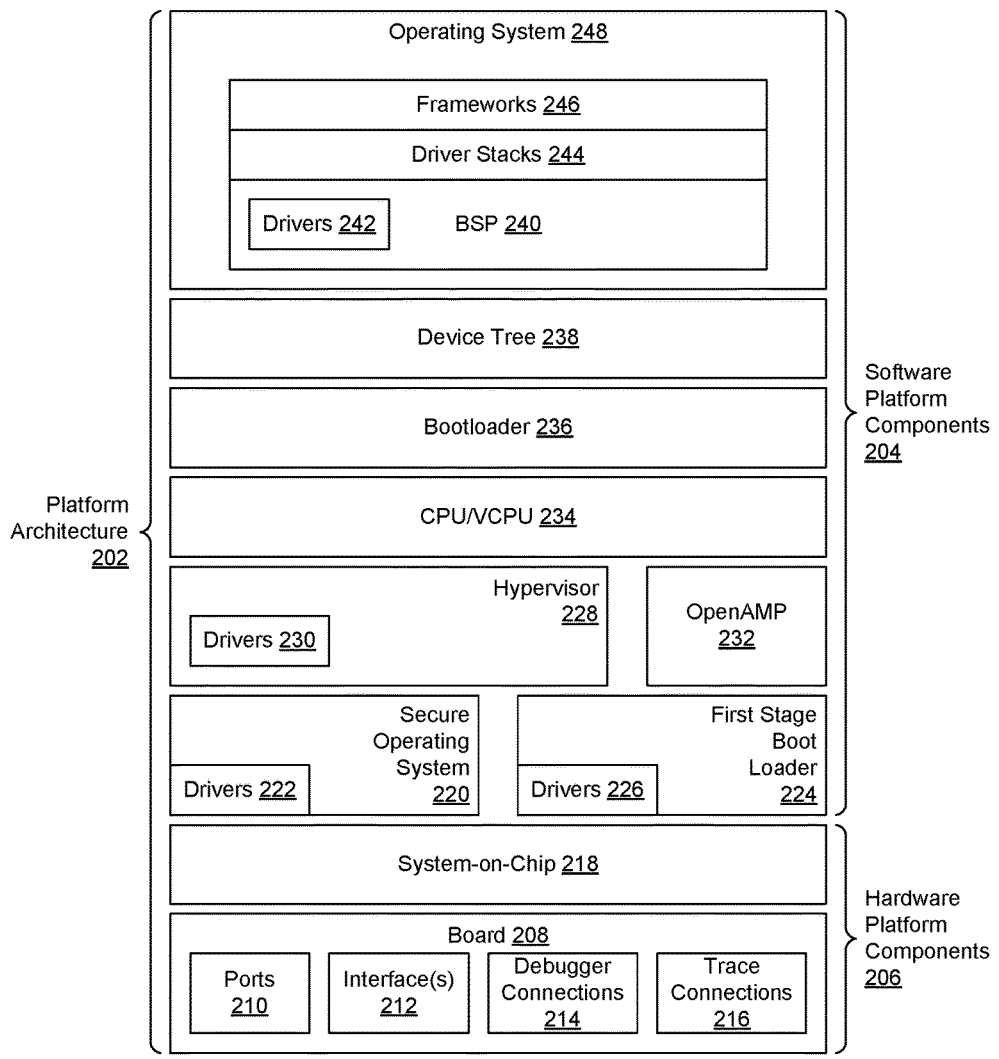
FIG. 2 illustrates example elements of a platform architecture.

FIG. 2 illustrates example elements of a platform architecture 202. Platform architecture 202, once defined, is capable of being implemented within an SOC such as SOC 100 of FIG. 1. As pictured, platform architecture 202 includes hardware platform components 204 and software platform components 206.

In general, the scope of platform architecture 202 begins with circuit board level interfaces and extends to the actual design, e.g., circuit designs, included as part of the platform, and up to software libraries. Platform architecture 202 serves as a foundation upon which an application, which may include further software and/or hardware, may be built.

As pictured, hardware platform components 206 include a board 208 and an SOC 218. Board 208 has elements including, but not limited to, ports 210, interfaces 212, debugger connections 214, and trace connections 216. SOC 218 also includes elements such as programmable circuitry (e.g., programmable logic), IC interconnects, MicroBlaze(s)™, and a PS including one or more processors and hardened circuit blocks (Intellectual Properties or "IPs"). In one example embodiment, SOC 218 is implemented as SOC 100 of FIG. 1.

In another aspect, SOC 218 is capable of performing partial reconfiguration. Partial Reconfiguration is a process where a region within the programmable circuitry of the SOC may be dynamically reconfigured by loading a partial bitstream into the SOC. The partial bitstream, for example, may specify different circuitry and/or a different system than previously implemented in the region. The region may undergo modification through partial reconfiguration while other regions of the programmable circuitry and SOC in general continue to operate without interruption. The region may be completely reconfigured without compromising the integrity or operation of the other portions of the programmable circuitry that are not modified and continue to operate as the reconfigurable region is modified.

In one or more embodiments, software platform components 204 include a secure operating system 220 having one or more drivers 222. Secure operating system 220 is an operating system that is executed by a processor, e.g., a core, of SOC 218 in a secure, e.g., trusted, mode of operation. Secure operating system 220 is considered trusted program code. In this regard, secure operating system 220 (and drivers 222) are physically distinct from operating system 248. Operating system 248, for example, may be considered non-secure (or non-trusted). A processor of SOC 218 is capable of switching between operating in a trusted mode where secure operating system 220 is executed and an untrusted mode where operating system 248 is executed. In some cases, the processor may switch between operating in trusted and non-trusted mode when multitasking on a per transaction basis. Trusted and non-trusted modes of operation, using secure operating system 220 and/or operating system 248, further may be used in symmetric multiprocessing (SMP) modes.

Software platform components 204 may include a first stage boot loader (FSBL) 224 having one or more drivers 226. FSBL 224, for example, is capable of preparing SOC 218 for boot. In one example, FSBL 224, upon execution by a processor of SOC 218, is capable of writing to the System-Level Control Registers (SLCRs) included in SOC 218 that control behavior of PS 102. For example, SLCRs control behavior of elements including, but not limited to, clocks, APU 106, RPU 108, memory controller 120, MIO 152, OCM 144, and so forth on a chip-wide basis. The SLCRs may control other functions including, but not limited to, clock control and status, reset control and status, secure/non-secure operation, debug functions, and so forth on a chip-wide basis.

In one example embodiment, software platform components 204 include a hypervisor 228. A hypervisor is software that creates and/or runs virtual machines. Hypervisor 228 includes one or more drivers 230. In another example embodiment, software platform components 204 include an Open Asymmetric Multi Processing (OpenAMP) software framework 232. OpenAMP 232 may be used in place of hypervisor 228. OpenAMP 232 allows an SOC to execute multiple operating systems (e.g., including different operating systems) and applications across homogeneous or heterogeneous processors included therein.

Software platform components 204 may include one or more central processing units (CPUs) 234 and/or one or more virtual CPUs (VCPUs) 234, a bootloader 236, and a device tree 238. Bootloader 236 is capable of loading the operating system, e.g., operating system 248 for CPU/VCPU 234. Bootloader 236, for example, is capable of loading an operating system and device driver(s) into one or more of the cores of the APU 106. In executing bootloader 236, FSBL 224 has completed operation. Device tree 238 is a tree data structure with nodes that describe the physical devices in a system or portion of a system, e.g., a processing domain.

Further, software platform components 204 may include a board support package (BSP) 240 having one or more drivers 242 and driver stacks 244. BSP 240 is a collection of software libraries and drivers that forms the lowest layer of the application software stack providing application programming interfaces (APIs) for application level software. Other components may include one or more frameworks 246 and operating system 248. As noted, operating system 248 may be a non-trusted operating system executed by CPU/

VCPU 234. Frameworks 246 may support inter-process communication (IPC) allowing two or more applications executing on a same computer/architecture to communicate with one another and exchange data via a shared pool of memory. In one embodiment, framework 246 may include a data bus or "DBus" which is a type of IPC and remote procedure mechanism.

Figure 3:
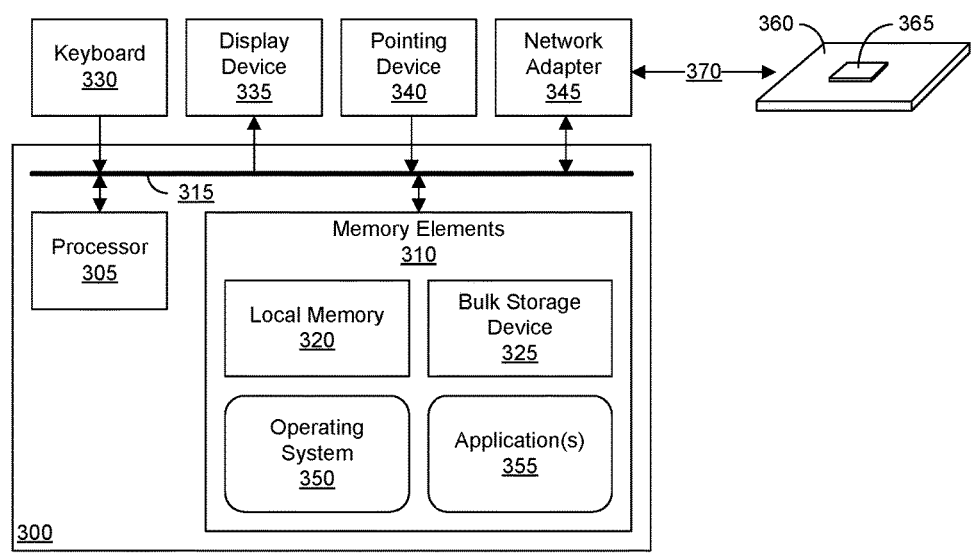
FIG. 3 is an example of a data processing system.

FIG. 3 is an example of a data processing system (system) 300. In one embodiment, system 300 is a computer or computing system. System 300, in executing suitable program code, is capable of creating a platform architecture. The platform architecture, once created, may be implemented within a particular SOC as described within this disclosure.

System 300 includes at least one processor 305 coupled to memory elements 310 through a system bus 315 or other suitable circuitry such as an input/output (I/O) subsystem. System 300 stores computer readable instructions (also referred to as "program code") within memory elements 310. Memory elements 310 may be considered an example of computer readable storage media. Processor 305 executes the program code accessed from memory elements 310 via system bus 315.

Memory elements 310 include one or more physical memory devices such as, for example, a local memory 320 and one or more bulk storage devices 325. Local memory 320 refers to random access memory (RAM) or other non-persistent memory device(s) generally used during actual execution of the program code. Bulk storage device 325 may be implemented as a hard disk drive (HDD), solid state drive (SSD), or other persistent data storage device. System 300 may also include one or more cache memories (not shown) that provide temporary storage of at least some program code in order to reduce the number of times program code must be retrieved from bulk storage device 325 during execution.

System 300 may be coupled to one or more I/O devices such as a keyboard 330, a display device 335, a pointing device 340, and/or one or more network adapters 345. System 300 may include one or more additional I/O device(s) beyond the examples provided. The I/O devices described herein may be coupled to system 300 either directly or through intervening I/O controllers. In some cases, one or more of the I/O device(s) may be combined as in the case where a touch sensitive display device 335 (e.g., a touchscreen) is used. In that case, display device 335 may also implement keyboard 330 and/or pointing device 340.

Network adapter 345 is a communication circuit configured to establish wired and/or wireless communication links with other devices. The communication links may be established over a network or as peer-to-peer communication links. Accordingly, network adapter 345 enables system 300 to become coupled to other systems, computer systems, remote printers, and/or remote storage devices. Example network adapter(s) 345 may include, but are not limited to, modems, cable modems, Ethernet cards, bus adapters, connectors, a wireless transceiver (whether long or short range), and so forth.

As pictured, memory elements 310 may store an operating system 350 and one or more application(s) 355. Application 355, for example, may be an electronic design automation (EDA) application. In one aspect, operating system 350 and application(s) 355, being implemented in the form of executable program code, are executed by system 300 and, more particularly, by processor 305, to perform the various operations described within this disclosure. As such, operating system 350 and application 355 may be considered an integrated part of system 300. Operating system 350, application 355, and any data items used, generated, and/or operated upon by system 300 such as hardware descriptions of systems and/or platform architectures are functional data structures that impart functionality when employed as part of system 300 or provided to a target IC for implementation therein in suitable format.

As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Examples of hardware descriptions generated using system 300 include, but are not limited to, block level descriptions of circuit designs with ports, register transfer level (RTL) descriptions specified as a netlist or using a hardware description language, a configuration bitstream, or another format. Another example of a hardware description is a device tree. A device tree may be used or read by a kernel executed by a processor within a processing domain, may be read or used by a hypervisor, and so forth. Another example of a hardware description includes a Boot Image Format (BIF) to be described herein in greater detail. The hardware description generated by system 300 may specify and/or include the various components described with reference to FIG. 2 in any of a variety of different data structures.

System 300 may include fewer components than shown or additional components not illustrated in FIG. 3 depending upon the particular type of device that is implemented. Further, one or more of the illustrative components may be incorporated into, or otherwise form a portion of, another component. For example, a processor may include at least some memory.

In another example embodiment, system 300 is coupled to a board 360 through a communication link 370. For example, system 300 may be coupled to board 360 through network adapter 345. In another example, system 300 may include one or more other I/O devices such as a Universal Serial Bus (USB) interface, or other communication port that may be used to couple system 300 to board 360.

Board 360 may be a circuit board or card and have target hardware such as a target IC 365 coupled thereto. In one arrangement, target IC 365 may be implemented as a programmable SOC. System 300 may be configured to provide or download configuration data specifying a platform architecture to target IC 365. With the configuration data loaded into target IC 365, the platform architecture and/or circuit design is physically implemented within target IC 365.

Figure 4:
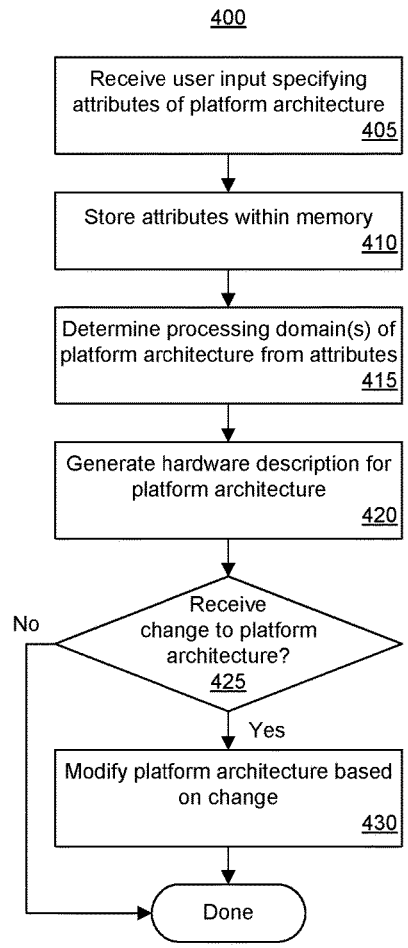
FIG. 4 is an example method of creating a platform architecture for an SOC.

FIG. 4 is an example method 400 of creating a platform architecture for an SOC. In one embodiment, method 400 is performed by a system such as the system described with reference to FIG. 3. The system is capable of performing the operations described herein to create a platform architecture and/or to implement the platform architecture and/or a complete application within an SOC.

In block 405, the system receives user input specifying attributes of a platform architecture. The system is capable of presenting a user interface through which a user may provide inputs specifying attributes of the platform architecture. In one embodiment, the user interface may be a command line interface through which the user may enter commands directly. In another embodiment, the user interface may include one or more graphical user interfaces (GUIs), e.g., forms and/or windows, through which the user may provide the user inputs. In one aspect, the GUIs are dynamic so that the system changes the GUIs and/or displays other GUIs responsive to received attributes.

In block 410, the system stores the attributes within a memory of the system. The system stores the attributes, for example, as a data structure therein. In block 415, the system determines one or more processing domains of the platform architecture from the attributes. Based on the attributes, the system determines the number of processing domains. Further, based on the attributes and for each processing domain, the system determines a particular type of processor available on the programmable SOC, a software operating context for the processor, memory for the processor, and any devices accessible by and/or coupled to the processor.

Based on the attributes, the system also determines whether each device is designated for implementation as a hardened circuit block or as a core that is implemented in the programmable circuitry of the SOC. Based on the attributes, the system is also capable of determining which elements, e.g., the processor, device(s), and/or memory, etc., is virtualized, if at all.

In one embodiment, the system is capable of translating the attributes received from the user, whether via GUI(s) or a command line interface, into script calls. The system is capable of executing the script calls and, as such, the scripts to generate the platform architecture. For example, execution of the scripts from executing the script calls brings the system to a particular state with a platform architecture specified, e.g., at least internally using an intermediate data structure.

In block 420, the system generates a hardware description for the platform architecture. In one embodiment, the hardware description includes a circuit design. In one example, the circuit design may be specified as a block-level description of the platform architecture that includes block level signaling and constraints. The circuit design may be synthesized, placed, and/or routed using EDA tools. The circuit design may specify I/O circuitry for the SOC whether implemented as hardened circuit blocks within the PS or within the programmable circuitry, devices of one or more different processing domains for implementation within the programmable circuitry of the SOC, interfaces between the processor(s) and the devices, and so forth. The circuit design may also be provided to other EDA tools so that other users may add application level hardware to the circuit design. The resulting circuit design also may be synthesized, placed, and/or routed using EDA tools.

In another embodiment, the hardware description may include a configuration bitstream. The configuration bitstream may specify each of the devices for the various processing domains that are to be implemented within the programmable circuitry and the addressing for the devices in order for the processor to read and/or write to such devices. Further, the configuration bitstream may specify connectivity, e.g., connective circuitry, between the processor(s) and the devices that are addressable by each respective processor. In one aspect, the connectivity may be through Advanced eXtensible Interface (AXI) interconnect circuitry implemented within the programmable circuitry and/or the PS. The configuration bitstream may also specify I/O for the SOC whether implemented in the PS using hardened circuit blocks and/or within the programmable circuitry of the SOC.

In another embodiment, the hardware description includes one or more device trees for the platform architecture. The system is capable of generating a device tree for each processing domain, or operating system, specified by the attributes. In one example, the device tree may be generated as device tree source as may be used for a Linux type of operating system. The device tree specifies addressing for the memory and devices of the processing domain. It should be appreciated that each different target SOC will utilize potentially different addressing schemes that are known.

For example, as part of generating device tree(s), the system is capable of assigning devices and/or memories to address spaces that may be used by the various processing domains that are specified. In one embodiment, the particular addresses, or address spaces, assigned to a device indicates whether that device is a hardened version of the device within the PS of the SOC or is implemented within the programmable circuitry of the SOC. For example, depending upon the target programmable SOC, some addresses and/or addresses spaces are reserved and used by hardened devices and/or memories within the PS of the SOC, while other addresses and/or address spaces are reserved for use by circuitry implemented in the programmable circuitry of the SOC. As an illustrative example, one model of programmable SOC may have programmable circuitry starting at an address of 1000 hex, while a different model of programmable SOC may have programmable circuitry starting at a different address.

The system is capable of specifying addressing for the devices and memory of the device trees to indicate whether such memories and/or devices are implemented using hardwired circuit blocks or are implemented within the programmable circuitry of the SOC based upon the attributes. The system may allocate addresses and/or address spaces to the memories and/or devices for the various processing domains according to whether such elements are to be implemented using hardened circuitry or programmable circuitry when generating the device tree(s). As such, the particular address assigned to an element indicates where that element is implemented within the SOC.

In still another embodiment, a device tree may include metadata that is understandable and/or consumable by a hypervisor. The system is capable of inserting such metadata within a generated device tree based upon the received attributes. The metadata may include instructions that are executable by the hypervisor. The metadata, for example, indicates to the hypervisor which elements, e.g., the processor, memory(ies), and/or device(s) are virtualized within the processing domain. The metadata may also indicate, for example, the level or amount of virtualization that is to occur for the processing domain, a number of instances of elements (e.g., a number of virtual processors), the operating system, and so forth.

In yet another embodiment, the hardware description may be, or include, boot program code. For example, the hardware description may be, or include, one or more Boot Image Files (BIF). A BIF may include one or more partitions. Each partition may include one or more different file types, data, and/or data structures. For example, the BIF may include a bootloader partition, an "init" (e.g., an initialization) partition, a boot image partition, and a data file partition. A bootloader partition, for example, may include a bootloader such as an FSBL for the SOC. The init partition may include a register initialization file and/or configuration files for other frameworks such as OpenAmp and so forth. The boot image partition may include a boot image, e.g., an operating system. The data file partition may include one or more files such as one or more applications, configuration bitstreams, a universal boot loader, e.g., corresponding to bootloader 236 (U-Boot), and so forth.

The system may generate one or more or all of the above-described data structures and/or combinations thereof to specify the platform architecture as a hardware description. The hardware description may be specified as a container file including one or more files and/or partitions therein or as one or more individual files.

In block 425, the system determines whether a change to the platform architecture is received. If so, method 400 continues to block 430. If not, method 400 may end. For example, the designer may continue to utilize the system to make further changes to the platform architecture. The designer may provide further inputs that add additional features (e.g., additional processing domains), remove features (e.g., processing domains), or make changes to existing processing domains. A designer may add devices to a processing domain, remove devices, change the type of processor and corresponding software operating context, change whether devices are implemented as hardened circuit blocks or as cores within the programmable circuitry, change the type and/or amount of memory for a processor domain, add or remove virtualization, and so forth.

In block 430, the system modifies the platform architecture based on the change received in block 425. In one embodiment, the system edits the existing hardware description to implement the change specified in block 425. In another embodiment, the system generates a new hardware description that incorporates the change from block 425. The new hardware description replaces the prior generated hardware description.

Figure 5:
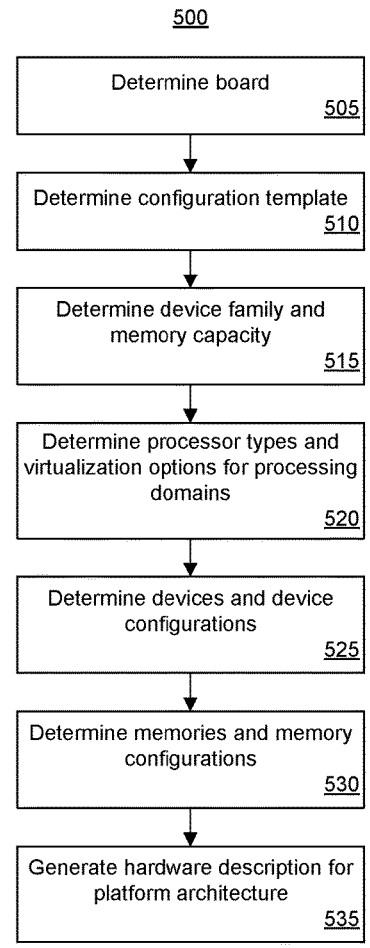
FIG. 5 is another example method of creating a platform architecture for an SOC.

FIG. 5 is another example method 500 of creating a platform architecture for a programmable SOC. In one embodiment, method 500 is performed by a system such as the system described with reference to FIG. 3. The system is capable of performing the operations described herein to create a platform architecture and/or to implement the platform architecture and/or a complete application within an SOC.

In block 505, the system determines a board that is to be used. For example, responsive to a user request to create a new platform architecture, the system may query the user for a board from a list of possible boards. The list further may include a "custom" board option that the user may select. The system receives a user input specifying a particular board as an attribute of the platform architecture.

In block 510, the system determines a configuration template for the platform architecture. For example, responsive to the system determining a board, the system may query the user for a particular configuration template. Example configuration templates may fit into a plurality of different configuration template types including, but not limited to:

Symmetric Multi Processing Configuration (Non-Virtualized);

Asymmetric Multi Processing Configuration (Non-Virtualized); and

Virtualized system using a hypervisor.

The available configuration template types allow a user to specify, at least initially, whether virtualization is to be used and whether the system is to be a symmetric or an asymmetric multi-processing system. In one embodiment, responsive to a user selection of a particular type of configuration template, the system is capable of querying the user for a particular configuration template. For example, responsive to a user input selecting the "Virtualized system using a hypervisor" option, the system may present one or more specific configuration templates for the selected configuration template type. Examples of specific configuration templates of the virtualized variety may include, but are not limited to:

[APU] Hypervisor (SMP Linux, Free RTOS)/[RPU] Lock Step (FreeRTOS); and

[APU] Hypervisor (SMP Linux, Free RTOS)/[RPU] Split (FreeRTOS).

As illustrated, the example configuration templates provide different preset, or predetermined, processor and software operating context combinations. Each processor and corresponding software operating context corresponds to one processing domain. In this regard, the selected configuration template determines the number of processing domains.

In block 515, the system determines a device family for the SOC and a memory capacity for the determined device family. As an illustrative example, the system may determine that, given the particular type of configuration template that is selected, a Zynq® Ultrascale+™ MPSoC is a suitable SOC. In another embodiment, the system may query the user as to the amount of memory for the selected SOC. For example, the system can query the user as to how many gigabytes of off-chip dynamic RAM are to be included on the board that will be available for the SOC.

In block 520, the system determines the processor types and virtualization options (if any) for the processing domains of the platform architecture being created. For example, the system may display a hierarchy or tree view of the platform architecture with the name of the platform architecture as the root node, each processing domain as the first level node, and CPU, devices, and memory as the second level nodes beneath each processing domain first level node.

It should be appreciated that while an initial configuration is specified through selection of a configuration template, the user may delete processing domains, add processing domains, and modify processing domains as described. In block 520, for example, responsive to a user selection of an element such as a processor, the system may display a further GUI through which the user may specify attributes of the selected element. As an illustrative example, responsive to a user selection of a CPU in a processor domain, the system may display a GUI through which user input specifying a processor type (APU vs. RPU), whether virtualization is to be used, and so forth. In the case where virtualization is to be used, the GUI may further query the user for the number of processors, processor affinity (the particular cores to be used), and so forth.

In block 525, the system determines the devices and device configurations for the processing domains. In block 525, for example, the system is capable of determining each device that is addressable by the processor for each domain. Further, the system is capable of determining whether the device is to be implemented as a hardened circuit block within the PS or using a core within the programmable circuitry. Accordingly, the system may determine and/or assign addresses and address ranges to the devices and/or memories for each processing domain.

In one aspect, as part of the selected configuration template, one or more default devices are included within each processing domain. Responsive to a user request to delete a particular device, the system may remove the specified device from the designated processing domain. Similarly, responsive to a user request to add a device to a particular processing domain, the system may add a device. Further, responsive to adding the device, the system may present a GUI through which further detailed attributes about the device (e.g., a configuration) may be received. For example, the attributes specifying whether the device is to be implemented as a hardened circuit block within the PS or using a core within the programmable circuitry can be received through the GUI.

In block 530, the system determines memories and memory configurations for the processing domains. In block 530, for example, the system is capable of determining each type of memory and the portion of the memory that is addressable by the processor for each domain.

In one aspect, as part of the selected configuration template, one or more default memories are included within each processing domain. Responsive to a user request to delete a particular memory, the system may remove the specified memory from a processing domain. Similarly, responsive to a user request to add a memory to a particular processing domain, the system may add a memory. Further, responsive to adding the memory, the system may present a GUI through which further detailed attributes about the memory (e.g., a configuration) may be received.

In block 535, the system generates a hardware description for the platform. In generating the hardware description, the system is capable of determining the necessary settings to enable the selected devices in each processing domain, define the software operating context for each processor, establish connectivity so that processors are able to address the devices and/or memories belonging in each respective processing domain, and implement the necessary interconnections between the various elements in each respective processing domain.

In one or more embodiments, method 500 is an alternative to method 400. In one or more other embodiments, one or more or all of the blocks of method 500 may be used in combination with, or incorporated into, method 400. As a non-limiting example, configuration templates of method 500 may be incorporated into method 400.

FIGS. 6-9 are example GUIs for creating a platform architecture for an SOC. The example GUIs illustrated in FIGS. 6-9 provide a mechanism through which user inputs are received to specify attributes of the platform architecture. For example, the system may display one or more of the GUIs described to receive attributes for the platform architecture as described with reference to FIGS. 4 and/or 5. For purposes of illustration, the platform architecture defined is implemented in an SOC as described with reference to FIG. 1.

Figure 6:
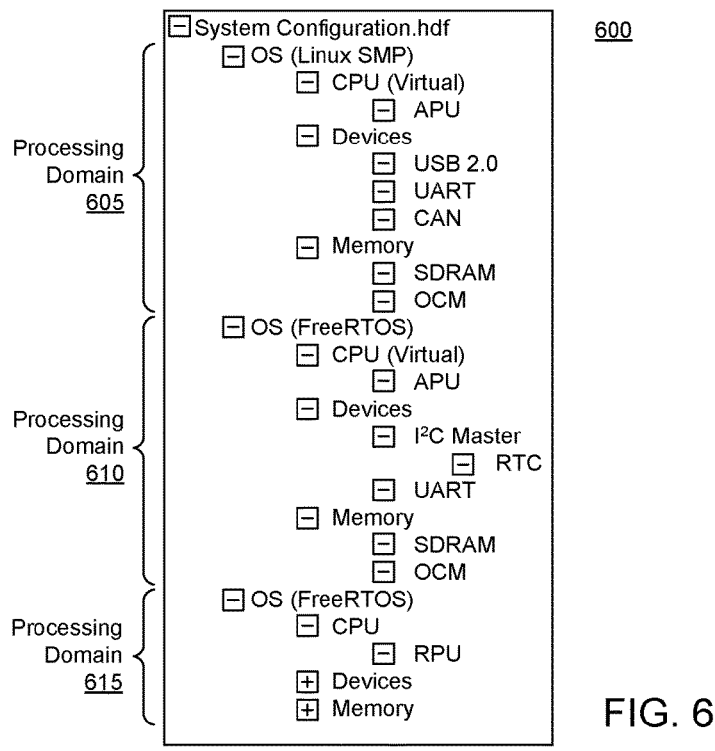

FIG. 6 shows an example GUI 600 for creating a platform architecture described by the hardware description file "System Configuration.hdf". The system may receive user input specifying instructions for the number of processing domains to include in the platform architecture. The system may also receive user input selecting particular processors, software operating contexts, devices, memory, and so forth for each processing domain.

As an illustrative example, the user may select an icon or other selectable interface element thereby instructing the system to create a processing domain, to add a device, and the like. With the elements added, selection of an element may cause the system to display a further configuration window through which further attributes for the selected element are received.

In this example, the system has received user inputs requesting the creation of three processing domains shown as processing domains 605, 610, and 615. In the case of processing domain 605, attributes specifying a virtual CPU that is implemented using a core of the APU are received. For the virtual CPU, a particular core of the APU is not specified. Accordingly, a virtual machine management application, e.g., a hypervisor, may determine the particular core to be used. In another embodiment, an attribute specifying a particular core for implementing the virtual CPU may be specified.

The software operating context for the CPU, as specified by the received attributes, is Linux SMP. As defined within this disclosure, a software operating context means an operating system that is executed by the designated processor or system. In one or more embodiments, a software operating context includes additional attributes or components beyond the operating system. For example, each particular operating system uses drivers and other resources that are specific to the operating system. By virtue of defining the operating system for a given software operating context, these drivers and other resources may be determined automatically by the system. Alternatively, these drivers and other resources may be determined from further user specified attributes. In any case, the additional drivers and/or resources may be considered part of the operating context. As discussed, elements of an operating context may be included in a boot image or other file containing boot program code generated by the system as part of the hardware description.

For processing domain 605, attributes specifying devices of a USB 2.0 interface, a universal asynchronous receiver/transmitter (UART), and a controller area network (CAN) are received. Further attributes specifying SDRAM and an OCM as the available memories for processing domain 605 are received.

The received attributes further specify that processing domain 610 includes a virtual CPU that utilizes a core of the APU. The software operating context for the virtual CPU of processing domain 610 is FreeRTOS (Free Real Time Operating System). Processing domain 610 includes an I$^2$C (Inter-Integrated Circuit) Master device, e.g., an RTC, and a UART. Memories for processing domain 610 include an SDRAM and an OCM.

The received attributes further specify that processing domain 615 includes a CPU that is implemented as one of the cores of the RPU. The software operating context for the CPU of processing domain 615 is FreeRTOS. In this example, the hierarchy for the platform architecture is collapsed so that the devices and memory for processing domain 615 are not shown.

As discussed, the system as described with reference to FIG. 3 generates a hardware description of the platform architecture responsive to determining the attributes of the system. Below are several example portions of a hardware description. Example 1 illustrates pseudo code for an example device tree, or portion thereof, for two cores of the APU as "CPU@0" and "CPU@1". Example 1 illustrates various settings for cores of the APU such as clocks, latency, and so forth for purposes of illustration.

EXAMPLE 1

```
compatible="xlnx, zynq-7000";
cpus {
#address-cells=<1>;
#size-cells=<0>;
CPU@0 {
    compatible="arm, cortex-a9:"
    device_type="cpu";
    reg=<0>;
    clocks=<&clkc 3>;
    clock-latency=<1000>;
```

```
    cpu0-supply=<&regulator_vccpint>;
    operating-points=<
       /* kHz uV */666667
       666667 1000000
       333334 1000000
    >;
  };
  cpu@1 {
    compatible="arm,cortex-a9:"
    device_type="cpu";
    reg=<0>;
    clocks=<&clkc 3>;
  };
};
```

A system, as described herein, is capable of compiling the device tree of Example 1 to generate a binary description (e.g., device tree blob) of hardware that may be used and/or read by a kernel executed by a processor, used or consumed by a hypervisor, and so forth.

Example 2 illustrates pseudo code for a hardware description implementing a USB interface and an Ethernet interface. As illustrated, the pseudo code defines the connectivity of the USB interface and the Ethernet interface to other elements of the platform architecture using the available interconnects in the SOC. The hardware description of Example 2 is a device tree, or portion thereof, defining available devices for a processor. In this example, the available interconnects utilize the AXI protocol for Intellectual Property (IP) cores. For example, the interconnects may conform to the AMBA AXI4-Stream Protocol Specification and/or the AMBA AXI Protocol Specification v2.0, another version, or other bus specification. As discussed, addressing specified below indicates whether the device is implemented as a hardened circuit block in the PS of the SOC or is implemented in the programmable circuitry of the SOC.

EXAMPLE 2

```
amba: amba {
  compatible="simple-bus";
  #address-cells=<1>;
  #size-cells=<1>;
  interrupt-parent=<&intc>;
  ranges;
  usb0: usb@e0002000 {
  clocks=<&clkc 28>;
  compatible="xlnx, ps7-usb-1.00.a", "xlnx, zynq-usb-
     1.00.a";
  status="disabled";
  interrupt-parent=<&intc>;
  interrupts=<0 21 4>;
  reg=<0xe0002000 0x1000>;
  gem0: ethernet@e000b000 {
  compatible="xlnx, ps7-usb-1.00.a";
  reg=<0xe00b000 0x1000>;
  status="disabled";
  interrupts=<0 22 4>;
  clocks <&clkc 13>, <&clk 30>;
  clock-names="ref_clk", "aper_clk";
  local-mac-address=[00 0a 35 00 00 00];
  xlnx, has-mdio=<0x1>;
  #address-cells=<1>;
  #size-cells=<0>;
};
```

Example 3 illustrates pseudo code in accordance with another example embodiment of a hardware description for a platform architecture. Example 3 illustrates commands that the system generates. As noted, the system is capable of generating a plurality of commands from received user inputs that, if executed by a system executing an EDA application (e.g., the system of FIG. 3), generates a further hardware description as a block diagram with ports or, in other cases, an RTL description. The commands illustrated in Example 3 may be generated from inputs received via one or more of the example GUIs described herein. The system executes the commands which cause the system to execute scripts that instantiate particular IPs or cores, define ports and connectivity among the instantiated elements, and/or define connectivity with the PS and processing domains implemented therein.

EXAMPLE 3

```
create_bd_cell
create_bd_intf_pin
connect_bd_intf_net
```

The pseudo code of Example 3 may also be entered directly into a command line type of user interface by a user (e.g., circumventing the GUIs) to cause the system to execute scripts to implement the platform architecture.

With the hardware description generated, the system may further process the platform architecture in combination with a user application through a design flow for implementation within the SOC. The design flow includes multiple, different phases. These phases generally include synthesis, placement, and routing.

Synthesis refers to the process of converting, or translating, an abstract, programmatic description of a circuit into a low-level design implementation. The abstract, programmatic description of the circuit describes behavior of the circuit and is also referred to as a "behavioral description" or a "register transfer level (RTL) description" of the circuit. The behavioral description is often specified using a hardware description language (HDL). The low-level design implementation generated through synthesis typically is specified as inter-connected logic gates.

In another aspect, the system is capable of processing a block-level hardware description that specifies ports and connectivity among the blocks to generate a behavioral description and/or a low-level design implementation specified as inter-connected logic gates.

Synthesis may also include mapping. Mapping is the process of correlating, or matching, the logic gates of the low-level circuit design to the various types of physical circuit blocks that are actually available in the particular IC in which the circuit design is to be implemented, i.e., the "target IC." For example, since a lookup table (LUT) may implement a complex function, one or more logic gates of the low-level design implementation may be mapped to a single LUT, or other programmable tile of the target IC. The mapped circuit design specifies the same functionality as the low-level design implementation, albeit in terms of the particular circuit blocks available on the target IC as opposed to low-level logic gates.

Placement is the process of assigning elements of the synthesized circuit design to particular instances of circuit blocks and/or resources having specific locations on the target IC. Once placed, a circuit element of the circuit design has a specific location on the target IC as opposed to only being assigned to a particular type of circuit block and/or resource as is the case after mapping and prior to placement. The location of a circuit element of a circuit design, once placed, is the location on the target IC of the instance of the circuit block and/or resource to which the circuit element is assigned. Routing is the process of selecting particular routing resources such as wires, PIPs, PIP settings, and/or other interconnect circuitry to electrically couple the various circuit blocks of the target IC after placement.

In coordination with the design flow, the system may perform compilation and/or linking operations for the executable software portions of the application to integrate those portions with the software framework of the hardware platform.

Figure 7:
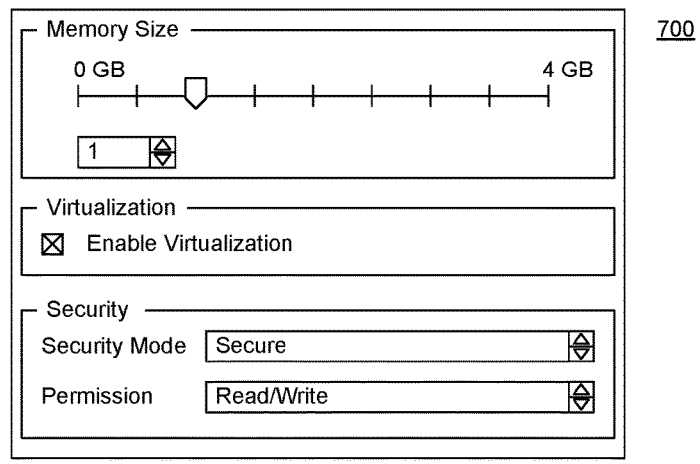

FIG. 7 is a GUI 700 illustrating specific attributes of a selected element shown in GUI 600. For purposes of illustration, consider the case where a user input has selected the SDRAM of processing domain 605. Responsive to a selection of the SDRAM of processing domain 605, the system is capable of displaying GUI 700. Through GUI 700, the system receives further attributes specifically for the SDRAM. As pictured, the received attributes for the SDRAM of processing domain 605 indicate that the SDRAM is to be 1 GB in size, have virtualization enabled, and implement a secure mode of operation requiring read/write permission.

FIG. 8 is a GUI 800 illustrating specific attributes of another selected element shown in GUI 600. In one example embodiment, responsive to a selection of the CAN device for processing domain 605, the system displays GUI 800. Through GUI 800, the system receives further attributes specifically for the CAN. As pictured, the received attributes for the CAN of processing domain 605 indicate that the CAN is to be implemented using a particular hardened instance of a CAN within the PS of the SOC. For example, the instance of the CAN may be specified as one of I/O devices 146, 148, or 140.

In the case where the platform architecture is to include a CAN device that is implemented in the programmable circuitry, the "Create New" option is selected. When the "Create New" option is selected, a particular core may be specified as an attribute in the available field. In that case, the platform architecture implements the CAN in the programmable circuitry of the SOC using the specified core rather than use a hardened instance of a CAN in the PS.

In GUI 800, a transfer rate for the CAN may be specified. GUI 800 shows a transfer rate of 1 Mbps being specified for the CAN. Further, GUI 800 allows a mode of operation to be specified for the CAN. In this case, the system determines that the mode of operation of the CAN is the loop back mode.

In accordance with another embodiment, the system can include a scripting engine. The scripting engine may be the same program code that is used to execute the scripts previously described herein. Users may interrogate the system via the scripting engine to obtain details about the platform architecture. For example, once the platform architecture is specified, a different user may utilize the system to submit queries to the scripting engine to determine the number of devices in a particular processing domain, what the mapped base address is, the number of processing domains, other attributes of the processing domains (e.g., virtualization and software operating context) and so forth.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the term "another" means at least a second or more. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system. As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof. As defined herein, the term "output" means storing in physical memory elements, e.g., devices, writing to display or other peripheral output device, sending or transmitting to another system, exporting, or the like. As defined herein, the term "plurality" means two or more than two.

As defined herein, the term "hardware description language" is a computer-language that facilitates the documentation, design, and manufacturing of a digital system, such as an integrated circuit. A hardware description language, or HDL, combines program verification techniques with expert system design methodologies. Using an HDL, for example, a user can design and specify an electronic circuit, describe the operation of the circuit, and create tests to verify operation of the circuit. An HDL includes standard, text-based expressions of the spatial and temporal structure and behavior of the electronic system being modeled. HDL syntax and semantics include explicit notations for expressing concurrency. In contrast to most high level programming languages, an HDL also includes an explicit notion of time, which is a primary attribute of a digital system.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context. As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, a graphics processing unit (GPU), a controller, and so forth.

As defined herein, the term "user" means a human being. The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

A method of creating a platform architecture can include receiving, using a computer, user input specifying a plurality of attributes of the platform architecture, wherein the platform architecture is adapted for implementation within an SOC, and determining, based on the attributes and using the computer, a processing domain of the platform architecture, wherein the processing domain includes a processor, a software operating context, a device, and a memory. The method can include generating, using the computer, a hardware description of the platform architecture specifying the processing domain, wherein the operating context is adapted for execution by the processor, and the device and the memory are addressable by the processor.

In one aspect, the hardware description can include a device tree. In one example, the device tree can indicate whether the device is implemented using a hardened circuit block of a PS of the SOC or using a core implemented in programmable circuitry of the SOC.

In another aspect, the processing domain can be at least partially virtualized. In that case, the device tree can include metadata adapted for use by a hypervisor for virtualizing at least a portion of the first processing domain. In one example, the metadata indicates that the processor is virtualized. In another example, the metadata indicates that the device is virtualized. In still another example, the metadata indicates that the memory is virtualized.

In another aspect, the hardware description can include a software framework adapted for executing multiple different operating systems on different ones of a plurality of processors of a PS of the SOC.

In another aspect, receiving user input specifying a plurality of attributes of the platform architecture can include receiving a selection of a configuration template specifying the processor and the software operating context as a predetermined combination.

In another aspect, the hardware description can include a configuration bitstream specifying the device of the first processing domain adapted for implementation within programmable circuitry of the SOC. The configuration bitstream can specify connective circuitry coupling the device and the processor.

In another aspect, the hardware description can include a first stage boot loader for the PS.

In another aspect, the hardware description can include a bootloader adapted to load an operating system for the PS.

In yet another aspect, the hardware description can include an operating system and a secure operating system for the PS.

A system for creating a platform architecture includes a computer configured to initiate executable operations. The executable operations can include receiving user input specifying a plurality of attributes of the platform architecture, wherein the platform architecture is adapted for implementation within an SOC and determining, based on the attributes, a processing domain of the platform architecture, wherein the processing domain includes a processor, a software operating context, a device, and a memory. The executable operations further can include generating a hardware description of the platform architecture specifying the processing domain, wherein the operating context is adapted for execution by the processor, and the device and the memory are addressable by the processor.

In one aspect, the hardware description can include a device tree. In one example, the device tree can indicate whether the device is implemented using a hardened circuit block of a PS of the SOC or using a core implemented in programmable circuitry of the SOC.

In another aspect, the processing domain can be at least partially virtualized. In that case, the device tree can include metadata adapted for use by a hypervisor for virtualizing at least a portion of the first processing domain. In one example, the metadata indicates that the processor is virtualized. In another example, the metadata indicates that the device is virtualized. In still another example, the metadata indicates that the memory is virtualized.

In another aspect, the hardware description can include a software framework adapted for executing multiple different operating systems on different ones of a plurality of processors of a PS of the SOC.

In another aspect, receiving user input specifying a plurality of attributes of the platform architecture can include receiving a selection of a configuration template specifying the processor and the software operating context as a predetermined combination.

In another aspect, the hardware description can include a configuration bitstream specifying the device of the first processing domain adapted for implementation within programmable circuitry of the SOC. The configuration bitstream can specify connective circuitry coupling the device and the processor.

In another aspect, the hardware description can include a first stage boot loader for the PS.

In another aspect, the hardware description can include a bootloader adapted to load an operating system for the PS.

In yet another aspect, the hardware description can include an operating system and a secure operating system for the PS.

A computer program product includes a computer readable storage medium having program code stored thereon for creating a platform architecture. The program code is executable by a computer to perform operations. The operations can include receiving user input specifying a plurality of attributes of the platform architecture, wherein the platform architecture is adapted for implementation within an SOC, and determining, based on the attributes, a processing domain of the platform architecture, wherein the processing domain includes a processor, a software operating context, a device, and a memory. The operations can also include generating a hardware description of the platform architecture specifying the processing domain, wherein the operating context is adapted for execution by the processor, and the device and the memory are addressable by the processor.

In one aspect, the hardware description can include a device tree. In one example, the device tree can indicate whether the device is implemented using a hardened circuit block of a PS of the SOC or using a core implemented in programmable circuitry of the SOC.

In another aspect, the processing domain can be at least partially virtualized. In that case, the device tree can include metadata adapted for use by a hypervisor for virtualizing at least a portion of the first processing domain. In one example, the metadata indicates that the processor is virtualized. In another example, the metadata indicates that the device is virtualized. In still another example, the metadata indicates that the memory is virtualized.

In another aspect, the hardware description can include a software framework adapted for executing multiple different operating systems on different ones of a plurality of processors of a PS of the SOC.

In another aspect, receiving user input specifying a plurality of attributes of the platform architecture can include receiving a selection of a configuration template specifying the processor and the software operating context as a predetermined combination.

In another aspect, the hardware description can include a configuration bitstream specifying the device of the first processing domain adapted for implementation within programmable circuitry of the SOC. The configuration bitstream can specify connective circuitry coupling the device and the processor.

In another aspect, the hardware description can include a first stage boot loader for the PS.

In another aspect, the hardware description can include a bootloader adapted to load an operating system for the PS.

In yet another aspect, the hardware description can include an operating system and a secure operating system for the PS.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of creating a platform architecture, comprising:
   receiving, using a computer, user input specifying a plurality of attributes of the platform architecture, wherein the platform architecture is adapted for implementation within a system-on-chip;
   determining, based on the attributes and using the computer, a processing domain of the platform architecture, wherein the processing domain includes a processor, a software operating context, a device, and a memory; and
   generating, using the computer, a hardware description of the platform architecture specifying the processing domain, wherein the operating context is adapted for execution by the processor, and the device and the memory are addressable by the processor.

2. The method of claim 1, wherein the hardware description comprises a device tree.

3. The method of claim 2, wherein the device tree indicates whether the device is implemented using a hardened circuit block of a processor system of the system-on-chip or using a core implemented in programmable circuitry of the system-on-chip.

4. The method of claim 2, wherein the processing domain is at least partially virtualized and the device tree comprises metadata adapted for use by a hypervisor for virtualizing at least a portion of the processing domain.

5. The method of claim 4, wherein the metadata indicates that the processor is virtualized.

6. The method of claim 4, wherein the metadata indicates that the device is virtualized.

7. The method of claim 4, wherein the metadata indicates that the memory is virtualized.

8. The method of claim 1, wherein the hardware description comprises a software framework adapted for executing multiple different operating systems on different ones of a plurality of processors of a processing system of the system-on-chip.

9. The method of claim 1, wherein the receiving user input specifying the plurality of attributes of the platform architecture comprises receiving a selection of a configuration template specifying the processor and the software operating context as a predetermined combination.

10. The method of claim 1, wherein the hardware description comprises a configuration bitstream specifying the device of the processing domain adapted for implementation within programmable circuitry of the system-on-chip.

11. The method of claim 10, wherein the configuration bitstream specifies connective circuitry coupling the device and the processor.

12. The method of claim 1, wherein the hardware description comprises a first stage boot loader for the processor system.

13. The method of claim 1, wherein the hardware description comprises a bootloader adapted to load an operating system for the processor system.

14. The method of claim 1, wherein the hardware description comprises an operating system and a secure operating system for the processor system.

15. A system for creating a platform architecture, comprising:
   a computer configured to initiate executable operations including:
   receiving user input specifying a plurality of attributes of the platform architecture, wherein the platform architecture is adapted for implementation in a system-on-chip;
   determining, based on the attributes, a processing domain of the platform architecture, wherein the processing domain includes a processor, a software operating context, a device, and a memory; and
   generating a hardware description of the platform architecture specifying the processing domain, wherein the operating context is adapted for execution by the processor, and the device and the memory are addressable by the processor.

16. The system of claim 15, wherein the hardware description comprises a device tree.

17. The system of claim 15, wherein the hardware description comprises a configuration bitstream specifying the device of the first processing domain implemented within programmable circuitry of the system-on-chip.

18. The system of claim 15, wherein the hardware description comprises boot program code for a processor system of the system-on-chip.

19. A computer program product comprising a computer readable storage medium having program code stored thereon for creating platform architecture, the program code executable by a computer to perform operations comprising:

receiving user input specifying a plurality of attributes of the platform architecture, wherein the platform architecture is adapted for implementation in a system-on-chip;

determining, based on the attributes, a processing domain of the platform architecture, wherein the processing domain includes a processor, a software operating context, a device, and a memory; and generating a hardware description of the platform architecture specifying the processing domain, wherein the operating context is adapted for execution by the processor, and the device and the memory are addressable by the processor.

20. The computer program product of claim 19, wherein the hardware description comprises a device tree.

* * * * *